Patented Feb. 18, 1936

2,031,362

UNITED STATES PATENT OFFICE 2,031,362

WATER - RESISTANT SANDPAPER AND OTHER ABRASIVE PAPERS AND PROCESS OF MAKING SAME

Carleton Ellis, Montclair, N. J., assignor to Ellis-Foster Company, a corporation of New Jersey No Drawing. Application February 18, 1927, Serial No. 169,412. Renewed September 9, 1933

9 Claims. (Cl. 51—280)

This invention relates to water-resistant abrasive papers or cloths such as sandpaper or emery cloth, abrasive strips for dental purposes, and relates especially to such abrasive sheets containing a binder of nitrocellulose and certain resinous bodies, as will be more fully hereinafter described. The present method of producing water-resistant sandpaper involves the employment of what is known as a long oil varnish. The use of this material requires protracted baking in order to bring about drying. Furthermore, when such abrasive paper is kept in storage for a year or more, oxidation of the binder progresses with consequent brittleness and deterioration.

In the present invention a binder of a less readily oxidizable nature, or one which is even substantially free from progressive oxidation preferably is employed. Furthermore, a binder is utilized which does not demand the protracted drying and seasoning period of the long oil varnish process.

The form of nitrocellulose which I may employ is a high viscosity nitrocellulose such as the so-called celluloid cotton, or I may employ the low viscosity nitrocellulose of say, one-half second viscosity, or slightly higher viscosity such as four second nitrated cotton. Various forms of gelatinized nitrocellulose such as waste or scrap celluloid, worn-out moving picture film freed from emulsion, smokeless powder material, and the like, may be employed in some cases. High viscosity nitrocellulose such as celluloid cotton of about twenty-five second viscosity (reckoned in terms of lacquer viscosity measurement) has relative high strength, toughness and flexibility, but being of high viscosity a greater proportion of solvent is required in preparing a solution of the binding composition for the purpose of carrying out the present invention. The low viscosity nitrocellulose such as the one-half second type does not call for as much solvent, but on the other hand the coating is not as strong and permanent as that obtained with the high viscosity product. A four second to ten second nitrocellulose possesses intermediate properties. In some cases a mixture of high viscosity and low viscosity nitrocellulose may be utilized.

As stated above I preferably employ a resinous substance in conjunction with the nitrocellulose. Preferably such resinous material is prepared by synthesis in order to get a more compatible product as most of the natural resins are not as capable of blending and assimulating with nitrocellulose as some of the synthetic products which will be described. The foregoing, however, does not preclude the employment of natural resins, preferably in conjunction with the synthetic products specified. Neither does it preclude the employment of natural resins which have been modified by chemical treatment, as for example, specially oxidized resins, or those which have been treated with glycerol, glycol, and the like, to make esterified products or ester gums.

A type of resin which I find adapted for the purpose is that made by reacting on glycerol with one or more resinifying organic acids.

Thus, products such as benzoic salicylic glyceride resin, benzoic phthalic glyceride resin, castor oil phthalic glyceride resin, may be employed.

A suitable resin is that obtained by heating

| | Parts by weight |
|---|---|
| Glycerol | 47 |
| Phthalic anhydride | 80 |
| Distilled cottonseed oil fatty acids | 45 | the temperature being carried to about 240° C. until a product of an acid number of say, twenty, is obtained.

A modified form of resin is obtained by treating the foregoing in solution with one or two per cent of its weight of sulphur monochloride. A liquid product may be obtained by heating

| | Parts by weight |
|---|---|
| Glycerol | 200 |
| Cottonseed fatty acids | 564 |
| Phthalic anhydride | 296 | the temperature being raised gradually to 260° C. This liquid product is useful as a softening and plasticizing substance for nitrocellulose and imparts good binding and adhesive qualities.

The nitrocellulose therefore affords strength and toughness and the resinous body, or the liquid synthetic products of a type such as that last described, promote binding action and adhesion, serving to retain the particles of grit to an advantageous degree when the sandpaper is put to use.

A composition was prepared as follows:—

| | Parts by weight |
|---|---|
| (a) One-half second nitrocellulose | 40 |
| Acetone | 100 |
| Tricresyl phosphate | 30 |

(b) Cottonseed phthalic glyceride resin of the type first described was dissolved in an equal weight of a mixture of 4 parts toluol to 1 part monochlorbenzol.

20 parts by volume of solutions (a) and (b) were mixed, 5 parts of butyl acetate and 5 parts of a plasticizing agent composed of equal parts of tricresyl phosphate and castor oil were added.

A coating of this composition was applied to strong well-sized kraft paper and before the coating had time to dry emery powder or fine sand was dusted on the surface. On drying for a few minutes in a warm oven the abrasive paper was ready for use.

Another binding composition was made from

| | Parts |
|---|---|
| Nitrocellulose | 8 |
| Cottonseed phthalic glyceride resin | 8 |
| Tricresyl phosphate | 12 |
| Secondary amyl acetate | 20 |
| Secondary butyl alcohol | 10 |
| Ethyl acetate | 10 |
| Benzol | 20 |

This solution was applied to a paper backing and before drying occurred carborundum grit was sprinkled on the surface and the coating dried a few minutes in a warm oven. The opposite side of the sheet was coated with the same composition without the grit. A flexible abrasive paper was obtained to which the abrasive was quite firmly attached.

When paper is employed as the support it may be waterproofed by wax or similar waterproofing substance. Thus, a paper may be prepared from paper stock which has been incorporated with a wax emulsion in the beater engine. Rosin size and wax emulsion may be used jointly. Methods adapted for the purpose of producing paper of this character suitable for employment in accordance with the terms of the present invention may be made as described in my co-pending applications Serial Numbers 101,580, filed April 12, 1926, entitled Paper composition and process of making same, which discloses and claims the production of water-resistant paper by the use of wax dispersions; 106,575, filed December 31, 1928, entitled Container and hood cap therefor, Patent No. 1,739,581, which discloses and claims closures particularly for bottles, which closures are made from paper carrying substances such as wax, etc., acting as dye lubricants in the drawing of such paper containers; and Serial No. 107,461 filed November 15, 1928, entitled Water-resistant paper disc stopper for milk bottles and the like, Patent No. 1,739,582, disclosing and claiming closures for containers, and particularly disc types of stoppers, made from pulp carrying wax emulsions, etc. and United States Patents 1,607,517; 1,607,518; 1,607,519 and 1,607,552.

In the preferred form of the present invention it is an object to produce a water resistant abrasive sheet in order that the product may be employed to rub down surfaces which are moistened with water. The employment of water resistant paper as a supporting material and the use of nitrocellulose and resin as aforesaid affords an abrasive sheet having the requisite qualities.

The proportion of nitrocellulose to resin given in the illustrative formulas is not one which should be rigidly followed in all cases. The size and kind of grit employed and the purpose for which the abrasive sheet is to be used will govern to a considerable extent the ratio between nitrocellulose and resin. In some cases the resin may be present in minor proportion, while in other cases it should be present in major proportion. The resins specified represent a type particularly useful for the purpose because they may be employed in major proportion, that is, say, to one part of nitrocellulose two to eight parts of resin are employed, without precipitation of the nitrocellulose from solution or coagulation during drying. Thus, the quality of adhesion, water resistance and other properties may be varied by varying the proportion of nitrocellulose and resin.

The flexibility is adjusted by means of plasticizing and softening agents to the special requirements in hand. When soft resins are used in considerable proportion less plasticizer will be required. When using a synthetic liquid product prepared as described above plasticizer may be omitted entirely if such liquid body is employed in substantial proportion.

Retardation of drying of the solvent from the coating may be accomplished by the addition of a small amount of a mineral wax, beeswax, or some vegetable waxes, one or two per cent of the wax usually being sufficient.

In some cases the abrasive may be lightly coated with the solution of binder by suitable pre-mixing and the mass rolled out onto a sheet of supporting material.

Abrasive sheets for other purposes such as the narrow strips employed by dentists for cleaning and polishing teeth may be made in like manner. For example, tracing cloth may be coated with a nitrocellulose composition as above and the surface, while still moist, dusted with fine pumice, cuttlefish powder, and the like. Similarly the paper discs employed by dentists for cleaning and polishing purposes may be coated with suitable abrasive material held in place by the binding agent aforesaid.

To minimize fire hazard, triphenyl or tricresyl phosphate may be employed as plasticizing agents and ground gypsum, perhydrated calcium sulphate or magnesium carbonate may be incorporated in the coating as fire retarding agents. Abrasive papers are obtainable, using a nitrocellulose binder, which are less easily ignited than papers produced with the aid of a long oil varnish.

What I claim is:—

1. An abrasive sheet comprising paper rendered water-resistant by wax deposited from emulsion in the paper stock, said water-resistant paper carrying a coating of abrasive grit bound to the surface by a binder comprising a nitrocellulose composition.

2. An abrasive sheet comprising paper rendered water resistant by wax deposited from emulsion in the paper stock, said water resistant paper carrying a coating of abrasive grit bound to the surface by a binder.

3. An abrasive sheet comprising paper rendered water resistant by wax deposited from emulsion in the paper stock, said water resistant paper carrying a coating of abrasive grit bound to the surface by a binder containing a synthetic resin.

4. An abrasive sheet comprising a water resistant paper support carrying a coating of finely divided grit bound to the surface of the paper by nitrocellulose and a synthetic resin of the glyceride type.

5. An abrasive sheet comprising water-resistant paper carrying a coating of a finely-divided abrasive grit bound to the surface by a binder comprising nitrocellulose and cottonseed oil phthalic glyceride resin.

6. An abrasive sheet comprising water-resistant waxed paper carrying a coating of a finely-divided abrasive grit bound to the surface by a binder comprising nitrocellulose and cottonseed oil phthalic glyceride resin.

7. An abrasive sheet material comprising a base, abrasive material and a coating on said base comprised of an oil-modified polyhydric alcohol-polybasic acid resin and nitrocellulose.

8. An abrasive sheet material comprising a water resistant base, abrasive material and a coating on said base comprised of an oil-modified polyhydric alcohol-polybasic acid resin and nitrocellulose.

9. An abrasive sheet comprising a water-resistant paper support carrying a coating of finely divided grit bound to the surface of the paper by a composition containing a cellulose ester and a synthetic resin of the glyceride type, said paper support carrying a backing of a composition containing cellulose ester and a synthetic resin of the glyceride type in order to waterproof the same.

CARLETON ELLIS.